(12) United States Patent
Kamata et al.

(10) Patent No.: US 10,409,489 B2
(45) Date of Patent: Sep. 10, 2019

(54) INPUT APPARATUS

(71) Applicant: SONY CORPORATION, Tokyo (JP)

(72) Inventors: Toshiaki Kamata, Kanagawa (JP); Munetake Ebihara, Tokyo (JP); Hideyoshi Wakimoto, Tokyo (JP); Akira Fujisawa, Tokyo (JP); Ichirou Higuchi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/540,358

(22) PCT Filed: Nov. 10, 2015

(86) PCT No.: PCT/JP2015/005603
§ 371 (c)(1),
(2) Date: Jun. 28, 2017

(87) PCT Pub. No.: WO2016/113783
PCT Pub. Date: Jul. 21, 2016

(65) Prior Publication Data
US 2017/0364259 A1 Dec. 21, 2017

(30) Foreign Application Priority Data
Jan. 16, 2015 (JP) ................. 2015-007063

(51) Int. Cl.
*G06F 3/0488* (2013.01)
*G06F 3/041* (2006.01)
(Continued)

(52) U.S. Cl.
CPC ........ *G06F 3/04886* (2013.01); *G06F 3/0202* (2013.01); *G06F 3/023* (2013.01);
(Continued)

(58) Field of Classification Search
CPC ...... G06F 3/0238; G06F 3/016; G06F 3/0414; G06F 3/0488; G06F 3/04883; G06F 3/04886; G06F 3/0233
See application file for complete search history.

(56) References Cited

U.S. PATENT DOCUMENTS 9,454,270 B2 * 9/2016 Marsden ................. G06F 3/044
9,582,178 B2 * 2/2017 Grant ..................... G06F 3/0488
(Continued)

FOREIGN PATENT DOCUMENTS

JP 2005-346235 A 12/2005
JP 2011-28663 A 2/2011
(Continued)

OTHER PUBLICATIONS

International Search Report and Written Opinion of PCT Application No. PCT/JP2015/005603, dated Jan. 26, 2016, 2 pages of English Translation and 7 pages of ISRWO.

*Primary Examiner* — Xuemei Zheng
(74) *Attorney, Agent, or Firm* — Chip Law Group

(57) ABSTRACT

An input apparatus includes a keyboard module having a plurality of key areas, and having a plurality of sensor devices capable of detecting a pressure of a keying operation for each of the key areas; and a control circuit that adjusts a parameter of a processing relating to the keying operation of the keyboard module on a basis of information relating to a pressure detected by the sensor device for each of the key areas.

12 Claims, 12 Drawing Sheets

(51) Int. Cl.
*G06F 3/023*  (2006.01)
*G06F 3/044*  (2006.01)
*G06F 3/045*  (2006.01)
*G06F 3/02*   (2006.01)

(52) U.S. Cl.
CPC ............ *G06F 3/0233* (2013.01); *G06F 3/044* (2013.01); *G06F 3/045* (2013.01); *G06F 3/0414* (2013.01); *G06F 3/0418* (2013.01)

(56) References Cited

U.S. PATENT DOCUMENTS

| | | | |
|---|---|---|---|
| 2012/0105367 A1* | 5/2012 | Son | G06F 3/0414 345/174 |
| 2012/0126962 A1 | 5/2012 | Ujii et al. | |
| 2013/0093715 A1* | 4/2013 | Marsden | G06F 3/044 345/174 |
| 2013/0113715 A1* | 5/2013 | Grant | G06F 3/0488 345/173 |
| 2015/0116233 A1* | 4/2015 | Kono | G06F 3/041 345/173 |

FOREIGN PATENT DOCUMENTS

| | | |
|---|---|---|
| JP | 2012-103995 A | 5/2012 |
| JP | 2013-175149 A | 9/2013 |

\* cited by examiner

INPUT APPARATUS

CROSS REFERENCE TO RELATED APPLICATIONS

This application is a U.S. National Phase of International Patent Application No. PCT/JP2015/005603 filed on Nov. 10, 2015, which claims priority benefit of Japanese Patent Application No. JP 2015-007063 filed in the Japan Patent Office on Jan. 16, 2015. Each of the above-referenced applications is hereby incorporated herein by reference in its entirety.

TECHNICAL FIELD

The present technology relates to an input apparatus capable of detecting a keying operation of a key on a basis of a pressure applied to each key area.

BACKGROUND ART

As an input apparatus capable of electrostatically detecting an input operation, an input apparatus capable of performing a key input by typing a keyboard displayed on a screen is known. For example, Patent Literature 1 discloses such an input device that a GUI component such as a software keyboard is displayed on a typing panel having a function as a display device, and a displayed key is typed, thereby displaying the key.

CITATION LIST

Patent Literature

Patent Literature 1: Japanese Patent Application Laid-open No. 2012-146267

DISCLOSURE OF INVENTION

Technical Problem

With an input apparatus using a typing panel on which a keyboard is displayed, it is impossible to obtain a natural response to a keying operation, which can of course be obtained with a general mechanical keyboard, such as a click sound that is generated at a time of key typing, that is, a keying operation. Therefore, this does not provide a good operability for a user who is familiar with a keying operation on a mechanical keyboard.

Further, in a keyboard that uses a capacitive sensor as a sensor for detecting a keying operation by a user, it is determined that an effective keying operation is generated when a change amount of a capacitance at a time of performing a keying operation from an initial value is larger than a predetermined threshold value. However, a degree of force to be given at a time of the keying operation varies depending on users. Therefore, for example, there is a fear that a situation may occur in which a keying operation by a user who performs the keying operation with a very light force is not determined as an effective keying operation.

It should be noted that the problem described here is merely a part of problems to be solved by the present technology. In addition to this, there are problems to be improved in terms of various points.

In view of the circumstances as described above, it is an object of the present technology to provide an input apparatus with a more excellent operability.

Solution to Problem

To solve the problem described above, an input apparatus according to an embodiment of the present technology includes: a keyboard module having a plurality of key areas, and having a plurality of sensor devices capable of detecting a pressure of a keying operation for each of the key areas; and a control circuit that adjusts a parameter of a processing relating to the keying operation of the keyboard module on a basis of information relating to a pressure detected by the sensor device for each of the key areas.

The input apparatus may further include: a keying response device capable of giving a response of a sense of operation with respect to the keying operation for each of the key areas for the keyboard module as response information to a user, in which the control circuit may be configured to adjust an intensity of the response information of the keying response device as the parameter on a basis of information relating to the pressure.

The control circuit may be configured to adjust a sensitivity with respect to the keying operation for each of the key areas as the parameter on a basis of information relating to the detected pressure.

The control circuit may be configured to perform a determination among a plurality of typing methods including at least touch typing and one-finger typing, and on a basis of a result of the determination, adjust a sensitivity with respect to the keying operation as the parameter.

The control circuit may be configured to determine the typing method on a basis of information relating to the pressure with respect to the keying operation for one or more specific key areas corresponding to a home position immediately after booting.

The control circuit may be configured to determine the typing method on a basis of a typing speed.

The control circuit may be configured to determine the typing method on a basis of an average value of pieces of information relating to the pressure.

The control circuit may be configured to determine the typing method on a basis of a difference between two pieces of information relating to the pressure respectively detected with respect to the keying operations for two key areas.

The two key areas may be two key areas determined as a pair on the keyboard module in advance.

Alternatively, the two key areas may be two key areas stroked successively on the keyboard module.

The sensor device may be a mutual capacitance type capacitive sensor that detects the pressure of the keying operation for each of the key areas as a change in capacitance.

The sensor device may be a resistive touch sensor that detects the pressure of the keying operation for each of the key areas as a change in resistance value.

Advantageous Effects of Invention

As described above, according to the present technology, it is possible to provide the input apparatus with a more excellent operability.

MODE(S) FOR CARRYING OUT THE INVENTION

Hereinafter, embodiments according to the present technology will be described with reference to the drawings.

First Embodiment

Figure 1:
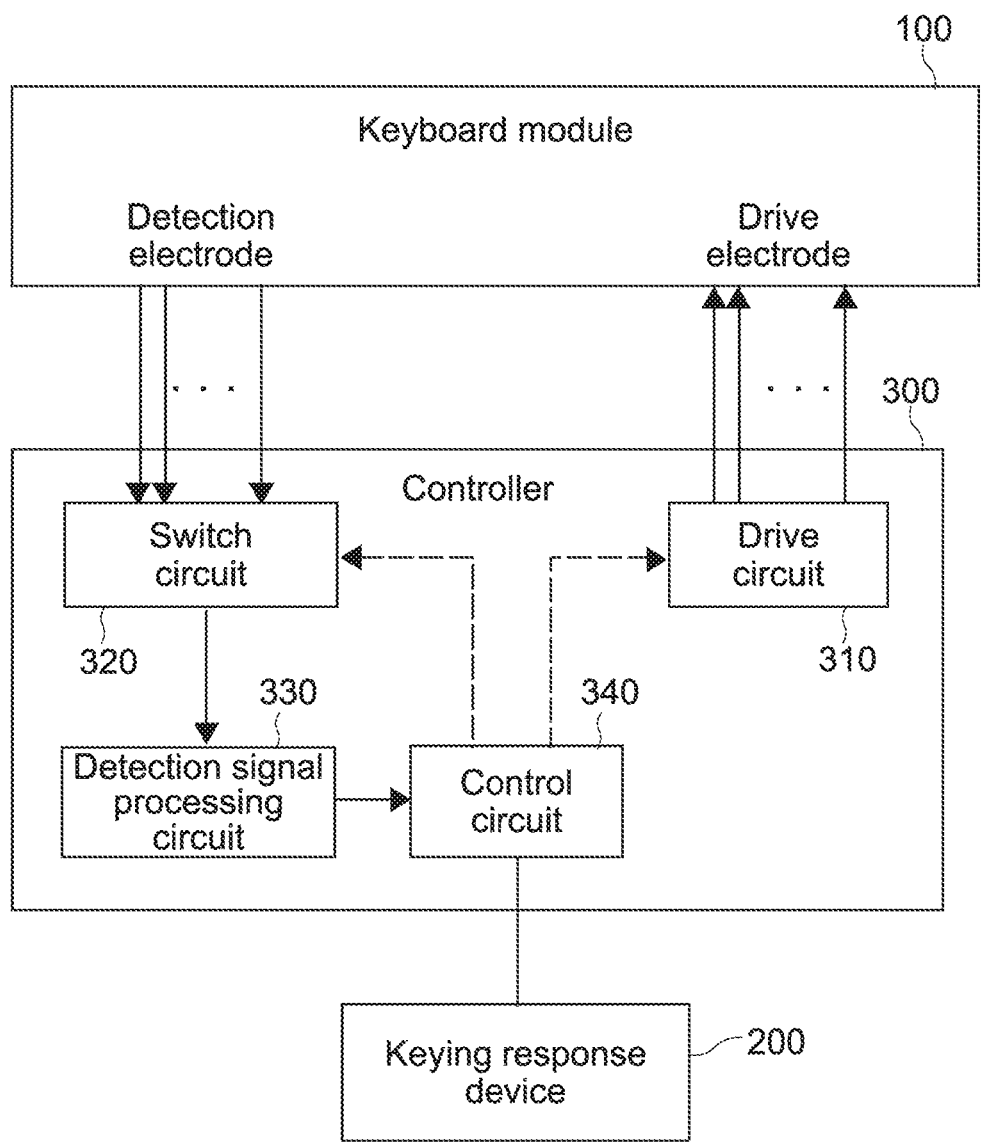
FIG. 1 A block diagram showing a configuration of an input apparatus according to a first embodiment of the present technology.

FIG. 1 is a block diagram showing a configuration of an input apparatus according to a first embodiment of the present technology.

An input apparatus 1 in this embodiment includes a keyboard module 100, a keying response device 200, and a controller 300.

(Keyboard Module 100)

The keyboard module 100 has a plurality of key areas (symbol 10a in FIG. 3) as operation areas for respective keys. The keyboard module 100 includes a sensor device that detects, when a user performs the keying operation on an arbitrary key area 10a with a finger in the plurality of key areas 10a, a pressure applied to the key area by the user. In this embodiment, as the sensor device, used is a capacitance device for each key, a capacitance of which is continuously changed depending of a shift amount of the key area 10a in a Z-axis direction which is generated by a pressure applied to the key area by the user.

It should be noted that as the sensor device, a resistive touch sensor, a resistance value of which is continuously changed depending on a shift amount of the key area 10a in the Z-axis direction which is generated by a pressure applied to the key area by the user.

It should be noted that in this description, "keying" means pressing one key, and "typing" means keying a plurality of keys successively.

In this embodiment, a case where a mutual capacitance type capacitive sensor is used as the capacitance device is considered.

(Example of Keyboard Module 100 Using Normal Mutual Capacitance Type Capacitative Sensor)

Figure 2:
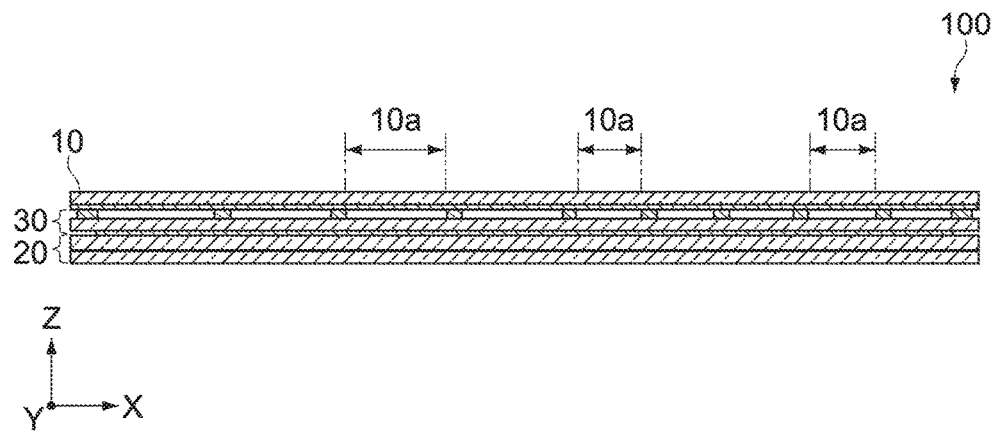
FIG. 2 A schematic cross-sectional view showing a keyboard module 100 that uses a mutual capacitance type capacitive sensor in the input apparatus shown in FIG. 1.
Figure 3:
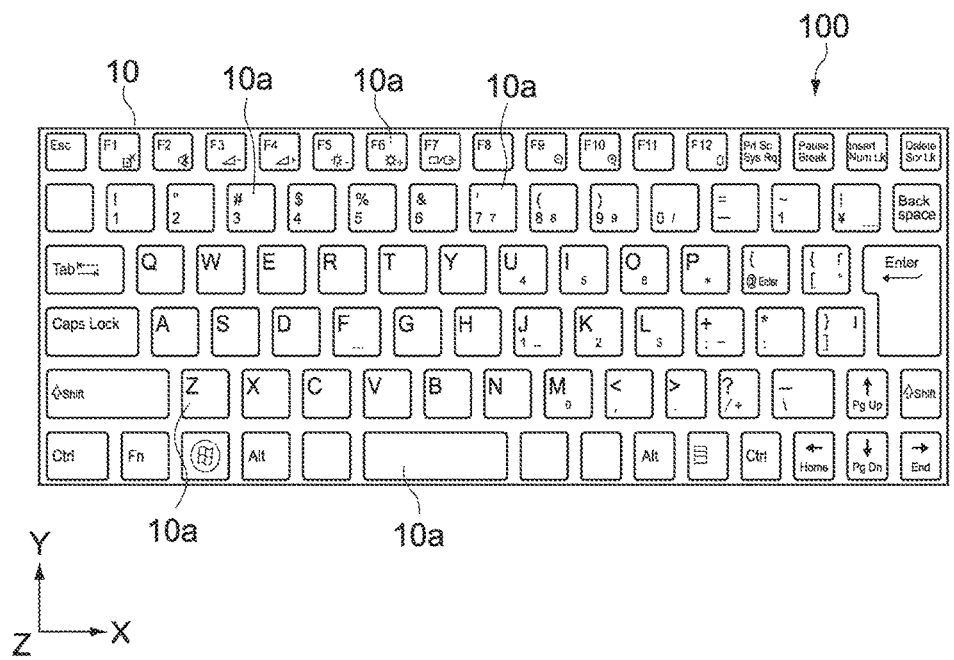
FIG. 3 A plan view showing an operation surface of the keyboard module 100 shown in FIG. 2.
Figure 4:
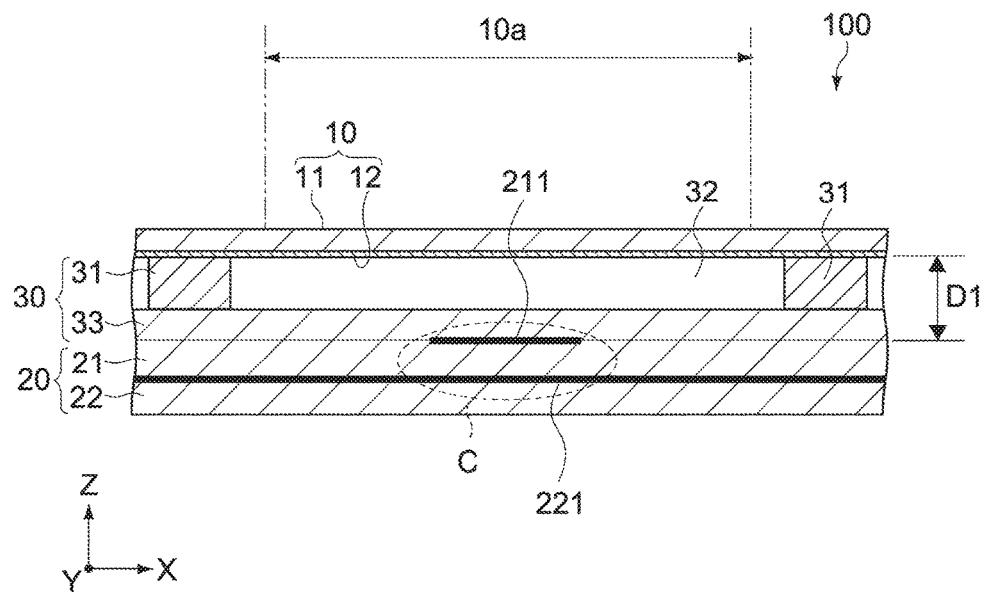
FIG. 4 An enlarged cross-sectional view showing a part corresponding to a key area group of a part of the keyboard module 100 shown in FIG. 2.

FIG. 2 is a schematic cross-sectional view showing the keyboard module 100 that uses a mutual capacitance type capacitive sensor, FIG. 3 is a plan view showing the keyboard module 100, and FIG. 4 is an enlarged cross-sectional view showing a part corresponding to a key area group of a part of the keyboard module 100.

It should be noted that in the figures, an X axis and a Y axis indicate directions (in-plane direction of the keyboard module 100) that are orthogonal to each other, and a Z axis indicates a direction (thickness direction of the keyboard module 100) that is orthogonal to the X axis and the Y axis.

The keyboard module 100 includes an operation member 10, an electrode substrate 20, and a support body 30.

Figure 5:
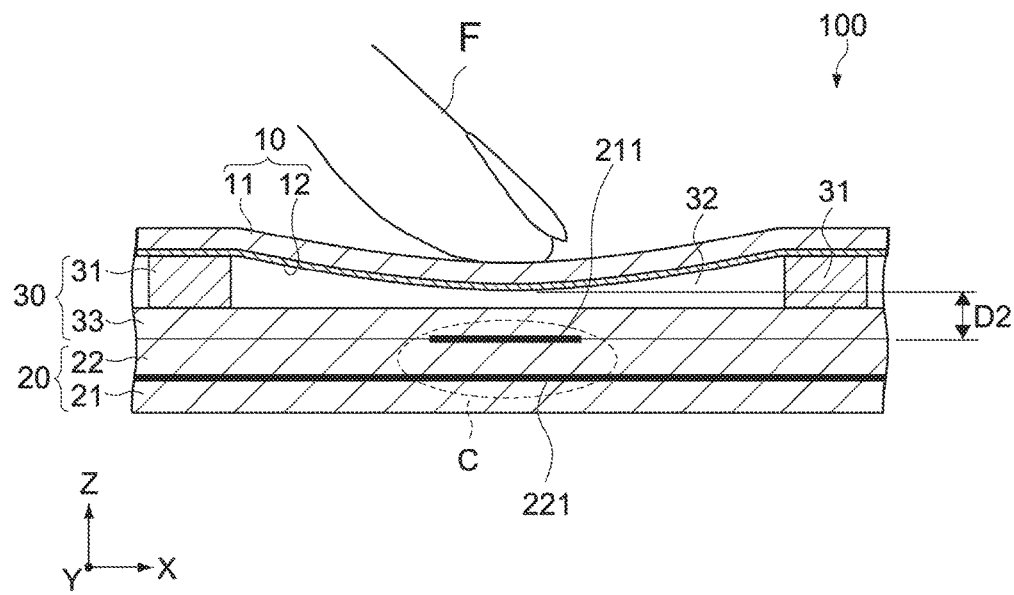
FIG. 5 An enlarged cross-sectional view showing the keyboard module 100 shown in FIG. 2 at a time when a pressure applied to a key area thereof with a finger of a user.

To the operation member 10, a plurality of key areas 10a that are arranged in a matrix pattern along the X-axis direction and the Y-axis direction is provided. The operation member 10 has a laminated structure of a base material 11 and a conductive layer 12. As shown in FIG. 5, the operation member 10 is configured to be elastically deformed in the Z-axis direction when a pressure is applied thereto from above with a finger F or the like of a user so as to correspond to a degree of the applied pressure. The conductive layer 12 is provided on a back surface of the base material 11 that faces the electrode substrate 20.

Figure 6:
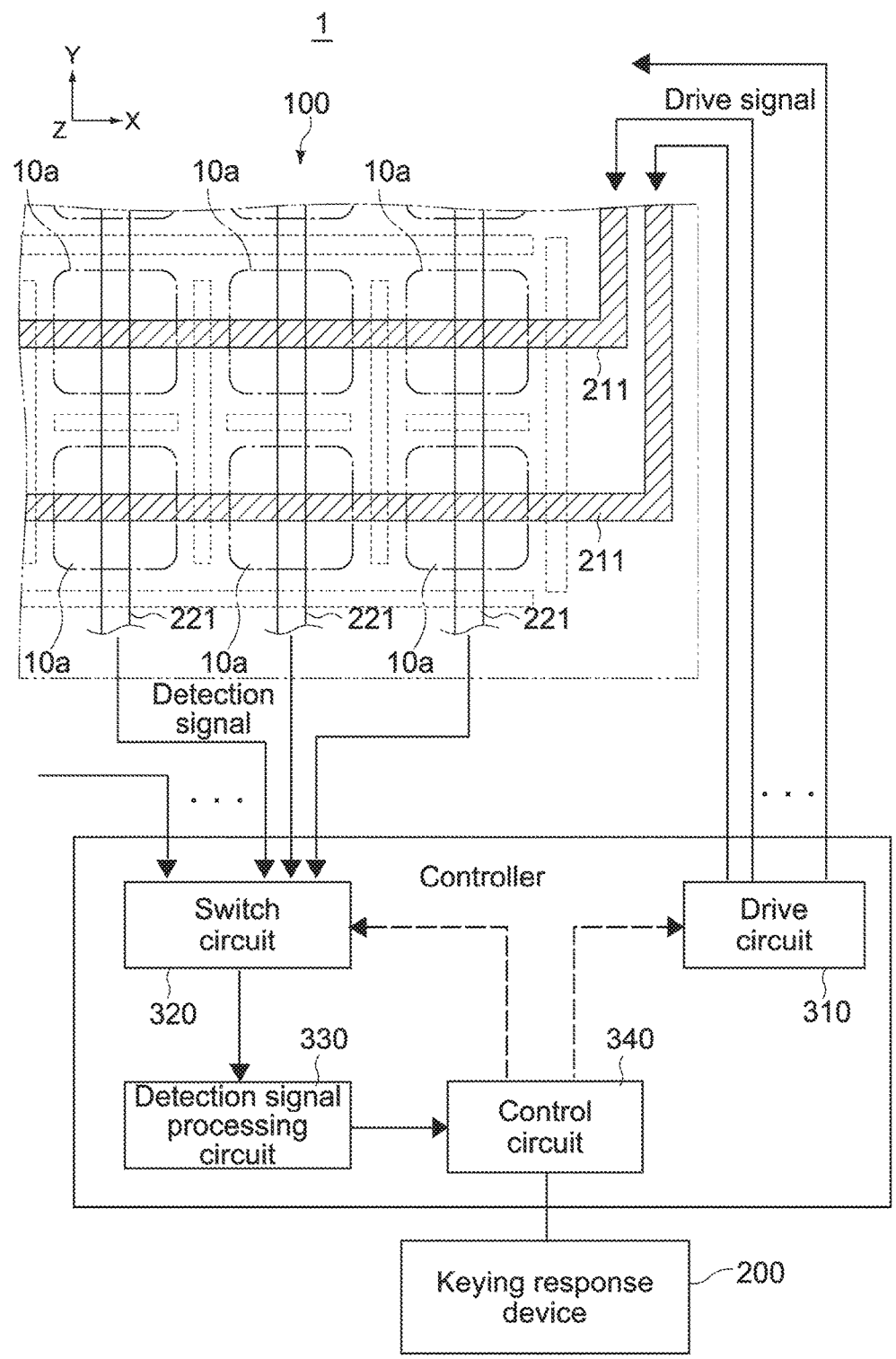
FIG. 6 A plan view showing a configuration of an electrode substrate 20 viewed in a Z-axis direction.

FIG. 6 is a plan view showing a configuration of the electrode substrate 20 when viewed in the Z-axis direction.

As shown in FIG. 5 and FIG. 6, the electrode substrate 20 has a laminated structure of a first wiring substrate 21 and a second wiring substrate 22.

For the first wiring substrate 21, a plurality of drive electrodes 211 to which drive signals from the controller 300 is applied is provided so as to be separated from each other in the Y-axis direction. On the other hand, for the second wiring substrate 22, a plurality of detection electrodes 221 is provided so as to be separated from each other in the X-axis direction. The plurality of drive electrodes 211 and the plurality of detection electrodes 221 are arranged so as to intersect each other in a lattice pattern. On each intersection portion of the drive electrodes 211 and the detection electrodes 221, by disposing the drive electrodes 211 and the detection electrodes 221 so as to face each other through the first wiring substrate 21 made of an insulation material, a capacitive element C (FIG. 4 and FIG. 5) exists that configures the mutual capacitance type capacitive sensor. When a drive voltage is applied to the drive electrodes 211, an AC signal current flows to the detection electrodes 221 through the capacitive elements C, and a detection voltage can be obtained with resistance components of the detection electrodes 221.

The capacitive element C has a preset initial capacitance. The initial capacitance of the capacitive element C is given on a basis of a relationship among the conductive layer 12, the drive electrodes 211, and the detection electrodes 221. As shown in FIG. 4 and FIG. 5, when the operation member 10 is pressed by the finger F or the like of the user, and a distance in the Z-axis direction between the conductive layer 12 of the operation member 10 and the drive electrodes 211 becomes shorter from D1 to D2, the capacitance of the capacitive element C is increased from the initial capacitance by a degree of the reduction of the distance D. A change amount of the capacitance can be detected from the detection voltage obtained through the detection electrodes 221 as change information of the capacitance of the capacitive element C in the controller 300.

(Controller 300)

As shown in FIG. 1 and FIG. 6, the controller 300 includes a drive circuit 310, a switch circuit 320, a detection signal circuit 330, and a control circuit 340.

The drive circuit 310 is a circuit that supplies, to each of the drive electrodes 211 of the keyboard module 100, a drive signal in a time division manner for each row.

The switch circuit 320 is a switch that switches the respective detection electrodes 221 of the keyboard module 100 with respect to the detection signal circuit 330 in a time division manner for each row.

The detection signal processing circuit 330 amplifies a detection signal of the detection electrode 221 selected by the switch circuit 320, and performs A/D conversion to supply the signal to the control circuit 340. The detection signal processing circuit 330 can change a gain of the amplitude on a basis of a control instruction from the control circuit 340.

The control circuit 340 is provided with a CPU, MPU, or a control circuit such as an IC for a specific use, and a memory such as a ROM and a ROM. In the memory, programs executed by the control circuit 340 and various kinds of information used when the programs are executed are stored. The information stored in the memory include various parameters for performing processing relating to the keying operation.

The control circuit 340 performs control for the input apparatus 1 by executing the programs stored in the memory. Specifically, for example, the following can be performed.
1. control for drive circuit 310
2. control for switch circuit 320
3. calculation of change amount from initial capacitance of capacitance of capacitive element C
4. determination of occurrence of keying operation on basis of comparison between change amount mentioned above and keying determination threshold value
5. adjustment of parameter for processing relating to keying operation based on change amount mentioned above Here, the parameters for the processing relating to the keying operation includes the following, for example.
5-1. intensity of response information of keying response device 200
5-2. sensitivity with respect to keying operation (Keying Response Device 200)

The keying response device 200 is a device for giving, to the user, a response of a sense of an operation to the keying operation by the user which is performed for the keyboard module 100. Specifically, the keying response device 200 is an utterance device, a vibration device, a display device, or the like which outputs response information such as sound, vibrations, and visual information with respect to the keying operation. In accordance with a parameter set by the control circuit 340 of the controller 300, the keying response device 200 can change the intensity of the response information such as the sound, vibrations, and visual information.

It should be noted that changing the intensity of the response information means changing a sound volume, changing a frequency of sound, changing a kind (waveform) of sound, or the like in a case where the response information is sound.

In the case where the response information is vibrations, changing the intensity of the response information means changing a degree (amplitude) of vibrations, changing a frequency of vibrations, changing a kind (waveform) of vibrations, or the like.

In the case where the visual information is the response information, changing the intensity of the response information means changing a light quantity of a light emitting device such as an LED (Light Emitting Diode), changing color, changing a content (image etc.) of display, or the like.

(Change Amount of Capacitance of Capacitative Element C from Initial Capacitance)

Figure 7:
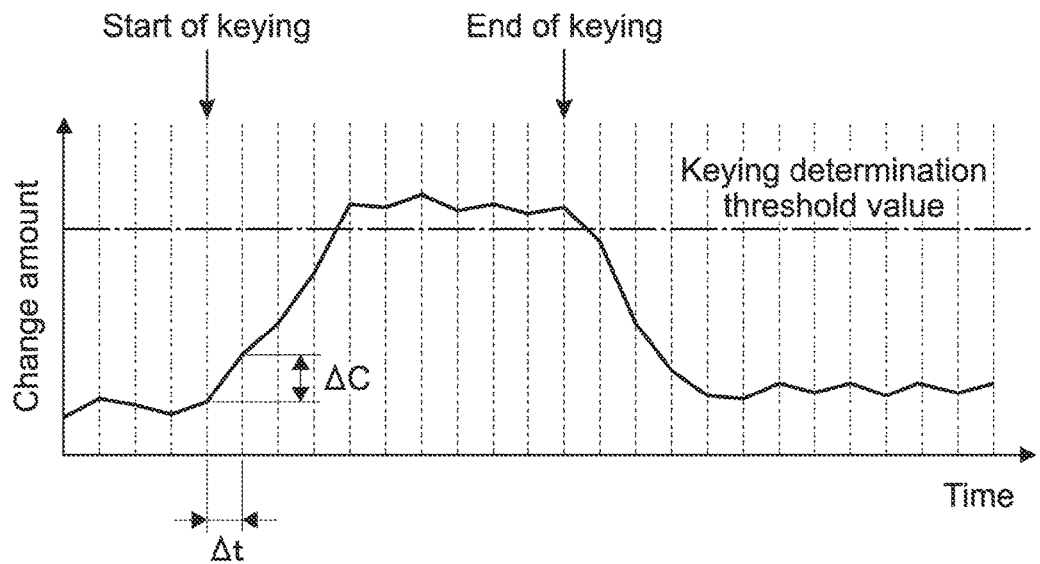
FIG. 7 A graph showing a transition of amounts of change in capacitance of a capacitive element C from an initial capacitance by a keying operation by a user.

FIG. 7 is a graph showing a transition of the change amount of the capacitance of the capacitive element C from the initial capacitance by the keying operation.

The control circuit 340 obtains the change amount of the capacitance of the capacitive element C from the initial value on a basis of a change amount of the detection voltage of the detection electrodes 221. Hereinafter, the change amount of the capacitance of the capacitive element C from the initial value is simply referred to as "change amount".

As shown in FIG. 7, when a pressure is applied to an arbitrary key area 10a of the keyboard module 100 with a finger or the like of the user, a part corresponding to the key area 10a of the operation member 10 sags (shifts) in the Z-axis direction by an amount corresponding to the degree of the applied pressure. The distance between the conductive layer 12 of the operation member 10 and the drive electrodes 211 in the Z-axis direction becomes shorter by the shift amount of the operation member 10, with the result that the change amount of the capacitance of the capacitive element C from the initial capacitance is increased. That is, in the keyboard module 100, the degree of the pressure applied to the key area 10a by the user can be obtained as the change amount of the capacitance of the capacitive element C from the initial capacitance. When the user releases pressing on the operation member 10, the distance between the conductive layer 12 of the operation member 10 and the drive electrodes 211 in the Z-axis direction returns to an original distance, with the result that the change amount is reduced. It should be noted that in FIG. 7, the change amount is generated before and after the keying operation by the user shows a noise component.

The control circuit 340 compares the change amount with the keying determination threshold value, determines that the effective keying operation is generated when the change amount is larger than the keying determination threshold value, and generates a key code assigned to the operated key area 10a.

(Adjustment of Intensity of Response Information of Keying Response Device 200)

Subsequently, a description will be given on a process of adjusting the intensity of the response information of the keying response device 200 on a basis of the change amount.

In a typical mechanical keyboard, when a key is punched strongly, a click sound resonates strongly corresponding to this. When a key is pressed lightly, a soft click sound is generated. In contrast, the keyboard module 100 of the input apparatus 1 according to this embodiment has no mechanism that gives a user a response on which a keying pressure is reflected with respect to the keying operation by the user, so this may give the user a sense of discomfort of the operation.

In the input apparatus 1 according to this embodiment, to reduce or eliminate the sense of discomfort of the keying operation, the control circuit 340 of the controller 300 changes the intensity of the response information to be given by the keying response device 200 in accordance with the change amount. As a result, it is possible to give the user a response on which the keying pressure is reflected.

Figure 8:
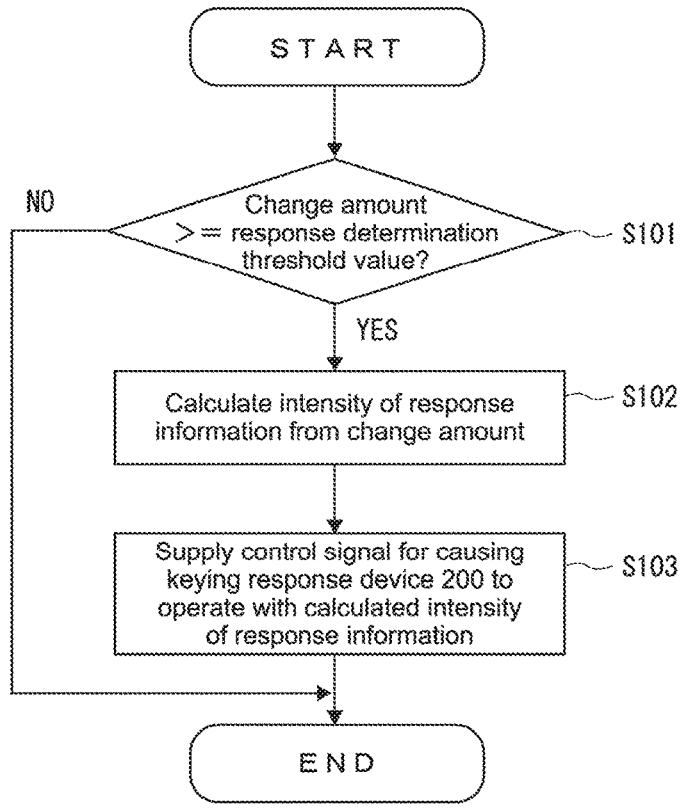
FIG. 8 A flowchart showing an intensity adjustment of response information of a keying response device 200.

FIG. 8 is a flowchart of the adjustment of the intensity of the response information of the keying response device 200.

In the memory of the control circuit 340, a response determination threshold value which is compared with the change amount is stored in advance. In the control circuit 340, the change amount and the response determination threshold value are compared (Step S101). In the case where the change amount is equal to or more than the response determination threshold value (Yes in Step S101), from a value of the change amount, the intensity of the response information of the keying response device 200 is calculated on a basis of a predetermined calculation expression (Step S102). Then, the control circuit 340 generates a control signal for causing the keying response device 200 at the calculated intensity of the response information, and supplies the signal to the keying response device 200 (Step S103). As a result, the keying response device 200 outputs the response information at the calculated intensity of the response information.

Here, the response determination threshold value may be the keying determination threshold value. Alternatively, in order to prevent the keying response device 200 from responding when a finger of the user lightly touches a key, for example, when the user tries to find a home position, the response determination threshold value may be a value lower than the keying determination threshold value.

As a method of calculating the intensity of the response information from the change amount, a method of setting the intensity of the response information to be higher as the change amount is larger can be given. More specifically, along with an increase in the change amount, the intensity of the response information is increased linearly or nonlinearly.

As described above, the control circuit 340 of the controller 300 changes the intensity of the response information to be given by the keying response device 200 in accordance with the change amount, with the result that the sense of the operation like the mechanical keyboard can be given to the user. As a result, it is possible to improve the operability of the keyboard module 100 using the capacitive sensor.

(Adjustment of Sensitivity with Respect to Keying Operation)

Subsequently, a description will be given on a process of adjusting a sensitivity with respect to a keying operation as the other parameter relating to the keying operation on a basis of the change amount.

Examples of the method of adjusting the sensitivity with respect to the keying operation includes the followings.

1. method of adjusting keying determination threshold value 2. method of adjusting gain of amplification circuit (Significance of Adjusting Sensitivity with Respect to Keying Operation)

As a typing method for a keyboard, a touch typing is known. In the touch typing, fingers of both hands of a user are placed on a home position on a keyboard as a preparation before an input operation. The home position refers to a state in which right and left forefingers of the user are placed on keys of "F" and "J" of the keyboard, respectively. In the touch typing, all the right and left fingers are used from the home position to perform typing. Further, in the touch typing, generally, wrists of both arms are supported by parts of a palm rest in front of the keyboard, and the fingers are moved down with heights of the palms of both hands not changed very much. Thus, in the touch typing, typing can be performed with a minimum movement. However, depending on users, there is a case where typing is performed with only right and left forefingers, or typing is performed without supporting wrists with both hands not in contact. Here, typing with only one finger of a right hand and one finger of a left hand is referred to as "one-finger typing".

Differences between the typing methods as described above are generated in terms of a keying pressure for a key or a typing speed. For example, generally, the keying pressure for the key by the touch typing is lower than that by the one-finger typing. In terms of the typing speed, the touch typing is performed faster than the one-finger typing in most cases. Further, in the touch typing, all fingers are used, so a relatively large difference is caused in the keying pressure depending on keys. For example, the keying pressure with a forefinger is significantly higher than the keying pressure with a little finger. In contrast, in the one-finger typing, the typing is performed with one determined finger such as a forefinger at all times, so small differences in the keying pressure among the keys are generated.

Here, in a case where the keying determination threshold value and the gain of the amplification circuit are constant, due to the differences of the typing methods as described above, the following troubles may be caused.

1. Some of users who perform the one-finger typing prefer to cause a key input to be received only when pressing a key strongly reliably. However, a keying determination threshold value to determine the sensitivity with respect to the keying operation and/or the gain of the amplification circuit is generally determined in consideration of the touch typing. In this consideration, it is difficult to cause the key input to be received only when the user who performs the one-finger typing presses a key strongly reliably.

2. In contrast, in a case where the keying determination threshold value and/or the gain of the amplification circuit is determined in consideration of the one-finger typing, at a time of the touch typing, due to a lack of the change amount, a determination error of an effective key input is likely to occur, for example, so it is also impossible to obtain a sufficient operability.

In the input apparatus 1 according to this embodiment, the keying determination threshold value and/or the gain of the amplification circuit appropriate to the at least two typing methods is stored in advance in the memory of the control circuit 340 as a part of the parameter for the process relating to the keying operation.

Here, "the keying determination threshold value and/or the gain of the amplification circuit" means any one of the followings.

Only keying determination threshold value

Only gain of amplification circuit

Both of keying determination threshold value and gain of amplification circuit (Adjustment of Keying Determination Threshold Value)

Subsequently, a description will be given on an operation in a case where the sensitivity with respect to the keying operation is adjusted by the keying determination threshold value.

In the case where the sensitivity with respect to the keying operation is adjusted by the keying determination threshold value, a first keying determination threshold value appropriate to the touch typing and a second keying determination threshold value appropriate to the one-finger typing are stored in advance in the memory in the control circuit 340 as a part of the parameter for the process relating to the keying operation. A magnitude relationship therebetween is the first keying determination threshold value<the second keying determination threshold value.

Figure 9:
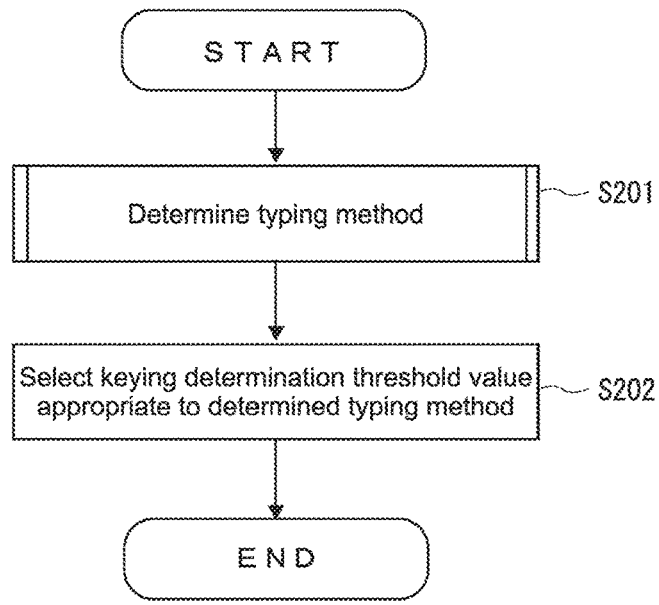
FIG. 9 A flowchart showing an adjustment process of a keying determination threshold value.

FIG. 9 is a flowchart showing an adjustment process of the keying determination threshold value.

The control circuit 340 of the controller 300 determines the typing method of the user immediately after the input apparatus 1 is booted (Step S201), for example. The method of determining the typing method of the user will be described later. The control circuit 340 selects the keying determination threshold value appropriate to the determined typing method from the first keying determination threshold value and the second keying determination threshold value (Step S202). The selected keying determination threshold value is effective until the operation of the input apparatus 1 is terminated, for example. Alternatively, during an operation of the input apparatus 1, the determination of the typing method of the user and the selection of the keying determination threshold value may be repeatedly performed with a predetermined period. Further, the keying determination threshold value immediately before a preceding termination of the input apparatus 1 may be used as it is as an initial value of the keying determination threshold value after a reboot.

Figure 15:
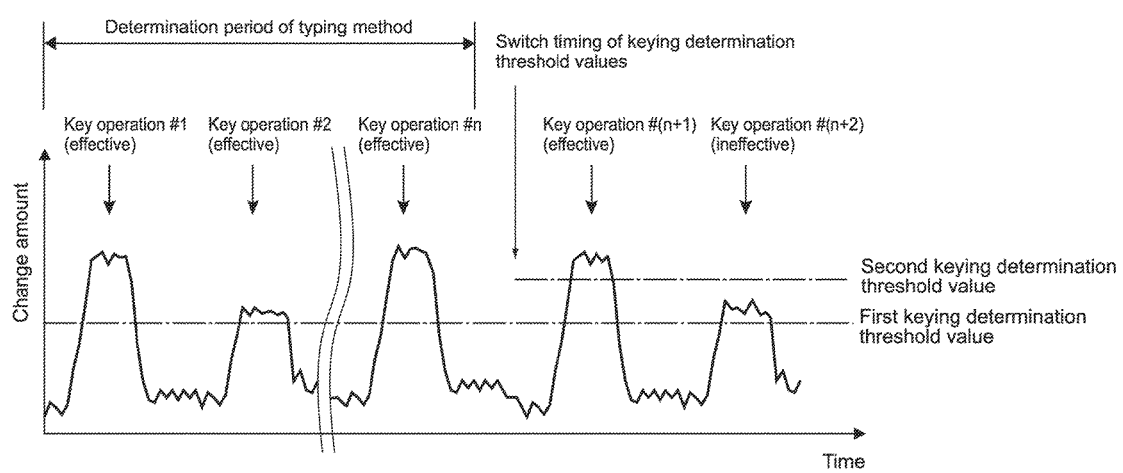
FIG. 15 A graph showing an example of an adjustment process of the keying determination threshold value.

FIG. 15 is a graph showing an adjustment process of the keying determination threshold value at a time of the one-finger typing.

In this example, as the keying determination threshold value, the first keying determination threshold value appropriate to the touch typing is set initially.

When the control circuit 340 determines that the typing method is the one-finger typing during the determination period of the typing method, the control circuit 340 switches the keying determination threshold value from the first keying determination threshold value appropriate to the touch typing to the second keying determination threshold value appropriate to the one-finger typing. Because the second keying determination threshold value is higher than the first keying determination threshold value, out of keys typed with one finger by the user until that time, only a keying operation performed strongly reliably by the user is determined as the effective keying operation, and a key input is received. For example, in FIG. 15, the change amount generated in a keying operation #(n+1) is higher than the second keying determination threshold value, so the keying operation #(n+1) is determined as the effective keying operation that the key input is received. Further, the change amount generated in a keying operation #(n+2) is lower than the second keying determination threshold value, so the keying operation #(n+2) is determined as an ineffective keying operation that the key input is not received.

(Determination of Typing Method)

Subsequently, a method of determining the typing method will be described.

Examples of an indicator for determining whether the typing is the touch typing or the one-finger typing include the followings.

a. change about relating to specific key corresponding to home position immediately after booting
b. time interval between keying operations (typing speed)
c. average value of change amounts
d. difference among change amounts
e. touching palm rest in front of keyboard It should be noted that the indicator that is actually used for the determination may be at least one of items a to e described above, a plurality of indicators may be used in combination, or all the indicators described above may be used at the same time.

Subsequently, a description will be given on a method of determining the typing method in a case where the respective indicators are individually used.

(Change Amount of Specific Key Corresponding to Home Position)

Figure 10:
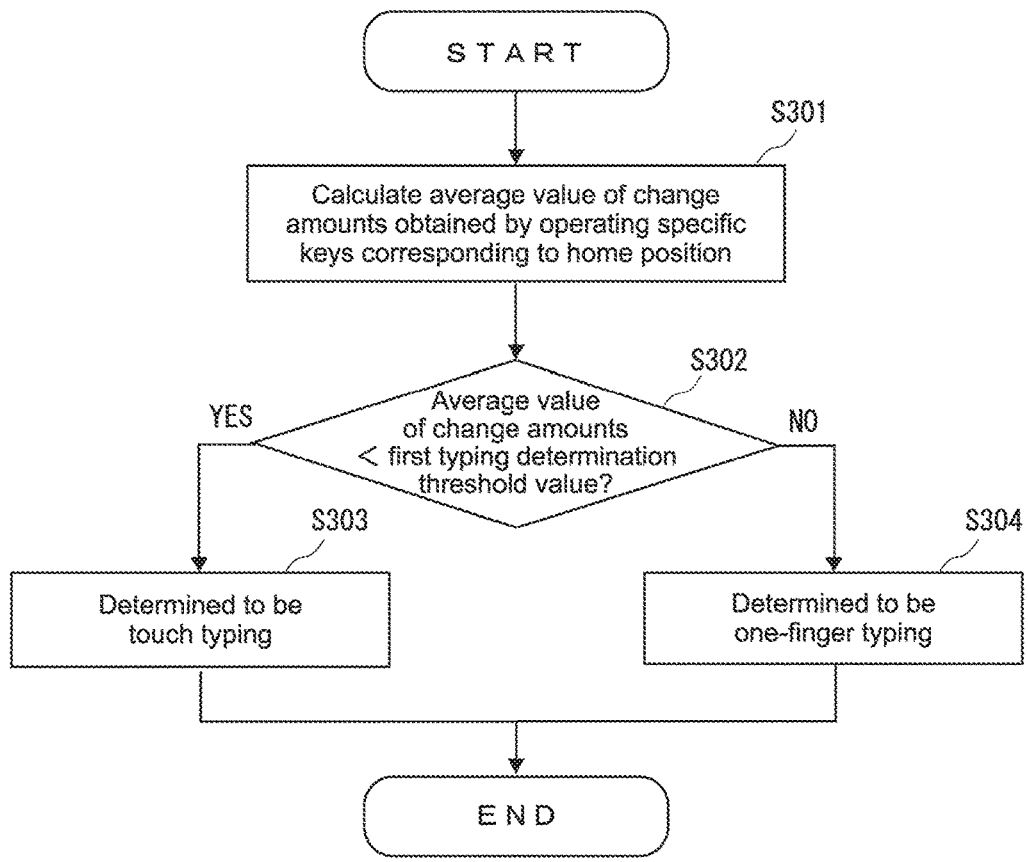
FIG. 10 A flowchart showing a typing method determination process based on a change amount of a specific key corresponding to a home position.

FIG. 10 is a flowchart showing a typing method determination process based on the change amount of one or specific keys corresponding to the home position.

The one or more specific keys corresponding to home position refers to one or more kinds of specific keys which may be lightly touched with fingers of the user when the user finds the home position on the keyboard module 100. More specifically, the specific keys are a key of "F" and a key of "J" (see, FIG. 3) or the like as the home position of left and right forefingers, respectively.

The control circuit 340 calculates an average value of the change amounts obtained by performing operations one or more predetermined number of times for the one or more specific keys corresponding to home position on the keyboard module 100 by the user immediately after the input apparatus 1 is booted (Step S301). At this time, the change amounts for both the keys "F" and "J" as the home position of the left and right forefingers may be targets to be evaluated, or the change amount for the one of the keys may be a target to be evaluated. Furthermore, not only the keys of "F" and "J" but also peripheral keys may be determined as keys belonging to the specific keys corresponding to the home position. For example, the peripheral keys mean "D" and "G" disposed on left and right sides of the "F" key, "H" and "K" disposed on left and right sides of the "J" key, or the like.

It should be noted that the operation of the one or more specific keys corresponding to home position in this case does not mean the effective keying operation that the change amount is larger than the keying determination threshold value, and the key input is received, but means such a keying operation that the change amount is generated irrespective of a magnitude relationship as compared to the keying determination threshold value.

The control circuit 340 checks the magnitude relationship between the calculate average values of the change amounts and a first typing determination threshold value (Step S302). Here, the first typing determination threshold value is a value lower than the first keying determination threshold value appropriate to the touch typing.

In the case where the calculated average value of the change amounts is less than the first typing determination threshold value (YES in Step S302), the control circuit 340 determines that the typing method is the touch typing (Step S303). Further, in a case where the average value of the change amounts is equal to or more than the first typing determination threshold value (NO in Step S302), the control circuit 340 determines that the typing method is the one-finger typing (Step S304).

(Time Interval of Keying Operations (Typing Speed))

Figure 11:
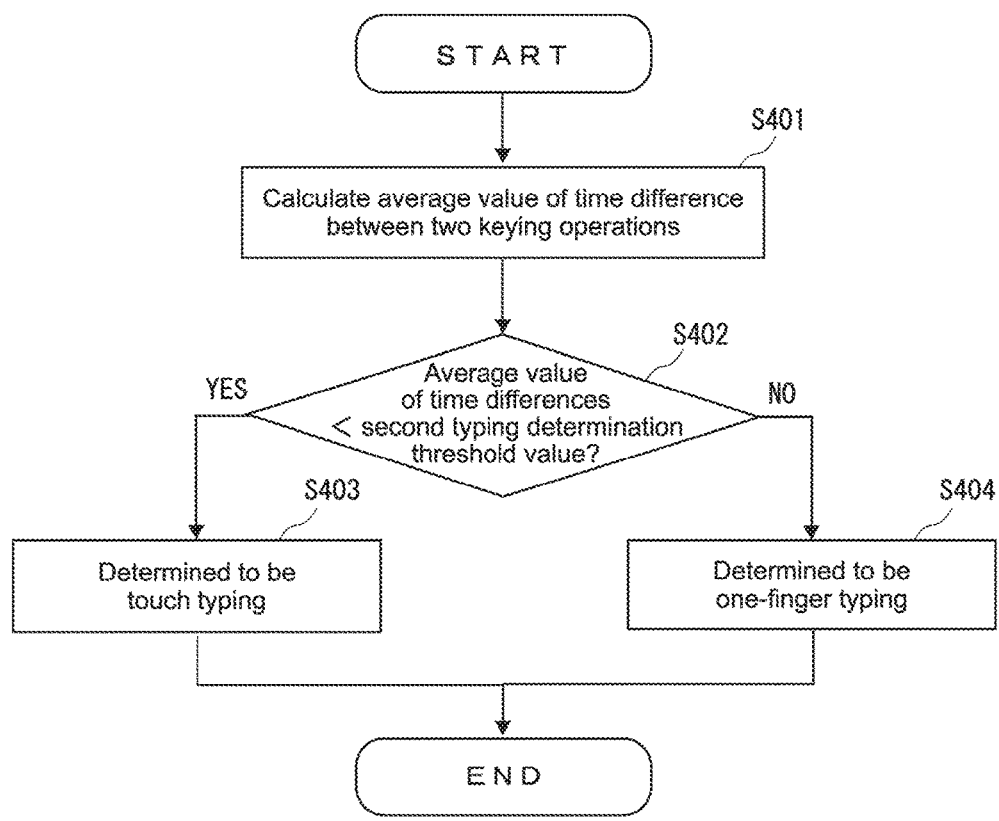
FIG. 11 A flowchart showing a typing method determination process based on a temporal interval (typing speed) of occurrences of keying operations.

FIG. 11 is a flowchart showing a typing method determination process based on a time interval of an occurrence of a keying operation (typing speed).

Immediately after the input apparatus 1 is booted, the control circuit 340 of the controller 300 calculates a time difference between two keying operations temporally successively performed, and calculates an average value of the time differences (Step S401). The calculation of the average value of the time difference is performed immediately after the input apparatus 1 is booted until the keying operation is performed a predetermined number of times of two or more.

It should be noted that the "keying operation" in this case may be a keying operation at a time when it is determined that the change amount is larger than the first keying determination threshold value or a threshold value only for typing method determination which is lower than the first keying determination threshold value.

The control circuit 340 determines a magnitude relationship between the calculated average value of the time differences and a second typing determination threshold value (Step S402). The second typing determination threshold value is a threshold value which is predetermined to determine whether the touch typing or the one-finger typing is performed as average value of the time differences as an indicator. Generally, the typing speed of the touch typing is faster than the typing speed of the one-finger typing, so by taking this into consideration, the second typing determination threshold value is determined.

In the case where the average value of the time differences is less than the second typing determination threshold value (YES in Step S402), the control circuit 340 determines that the typing method is the touch typing (Step S403). Further, in a case where the average value of the time differences is equal to or more than the second typing determination threshold value (NO in Step S402), the control circuit 340 determines that the typing method is the one-finger typing (Step S404).

It should be noted that in the determination of the typing method that uses the time interval of the keying operations (typing speed) as the indicator, in a case where a time difference that is significantly longer than the time difference of the second typing determination threshold value is calculated, the control circuit 340 eliminates the information relating to the time difference from the calculation of the average value. The time difference that is significantly longer than the time difference of the second typing determination threshold value is such a time difference as to be generated when the user temporarily stops typing, for example, one minute or the like.

(Average Value of Change Amounts)

A user who performs the touch typing causes wrists to be supported by a part in front of the keyboard and performs keying only by pressing down fingers with heights of palms not changed very much, while a user who performs the one-finger typing often performs keying with both hands not in contact therewith. Thus, generally, the average value of the change amounts in a case of the touch typing is lower than that in a case of the one-finger typing. Accordingly, the average value of the change amounts can be used as an indicator for determining the typing method.

Out of all the keys provided to the keyboard module 100, the average value of the change amounts may be obtained with respect to all the keys or a plurality of partial specific keys. In a case where the average value of the change amounts of the plurality of partial specific keys is obtained, a plurality of kinds keys stroked with all fingers including a little finger and a ring finger of a user who performs the touch typing is included in the plurality of specific keys whose average value of the change amounts is to be obtained. This is because when only keys that tend to be stroked with a thumb, a forefinger, and the like, with which stroke pressures are naturally increased are set as the plurality of keys as the targets, the average value of the change amounts is unreasonably increased, and is closer to the average value of the change amounts in the case of the one-finger typing, resulting in degradation of accuracy of the typing method determination.

Figure 12:
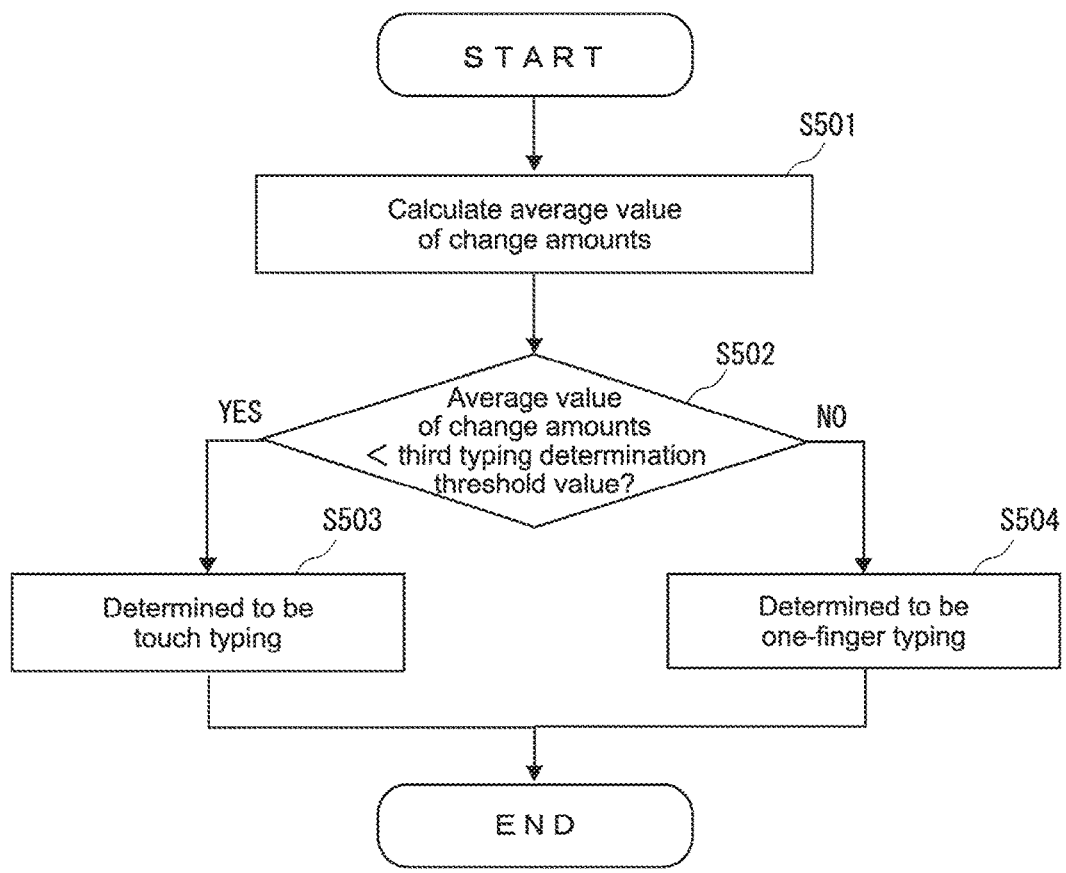
FIG. 12 A flowchart showing a typing method determination process based on an average value of change amounts.

FIG. 12 is a flowchart showing a typing method determination process based on an average value of change amounts.

Immediately after the input apparatus 1 is booted, the control circuit 340 of the controller 300 calculates the average value of the change amounts with respect to the keying operation for a plurality of specific keys as targets of calculation of the average value of the change amounts, respectively (Step S501).

It should be noted that the "keying operation" in this case may be a keying operation at a time when it is determined that the change amount is larger than the first keying determination threshold value appropriate to the touch typing or may be a threshold value only for typing method determination which is lower than the first keying determination threshold value.

The control circuit 340 determines a magnitude relationship between the average value of the change amounts and a third typing determination threshold value (Step S502). Third typing determination threshold value is a threshold value predetermined to determine whether the typing method is the touch typing or the one-finger typing with the average value of the change amounts as an indicator.

In the case where the average value of the change amounts is less than the third typing determination threshold value (YES in Step S502), the control circuit 340 determines that the typing method is the touch typing (Step S503). Further, in a case where the average value of the change amounts is equal to or more than the third typing determination threshold value (NO in Step S502), the control circuit 340 determines that the typing method is the one-finger typing (Step S504).

The determination of the typing method using the average value of the change amounts as the indicator is performed when the keying operation is performed two or more predetermined number of times immediately after the input apparatus 1 is booted. Instead, during the operation of the input apparatus 1, the determination may be repeatedly performed each time the keying operation is performed a predetermined number of times.

(Difference of Change Amounts)

Because in the touch typing, all the fingers of both hands are used, in the touch typing, an average value of differences of the change amounts which are detected with respect to two key operations tends to be larger than the one-finger typing. In view of this, the average value of the differences of the change amounts which are respectively detected with respect to the two key operations can be used as an indicator for determining the typing method.

It is desirable that the two keys as a target of determination of the average value of the differences of the change amounts be a specific key pair typed with different fingers in a case of performing the touch typing. For example, keys such as "F", "G", "V", and "B" are subjected to the keying operation with a left forefinger, and keys such as "A", "Z", and "Q" are subjected to the keying operation with a left little finger of in many cases. Therefore, all of one-to-one combinations of "F", "G", "V", and "B" with "A", "Z", and "Q" are determined as specific key pairs as targets of determination of the differences of the change amounts. That is, in a case where the keys of "A"→"G"→"Z" are successively operated in this order, an average value of a difference between the change amount detected when the key of "A" is operated and the change amount detected when the key of "G" is operated and a difference between the change amount detected when the key of "G" is operated and the change amount detected when the key of "Z" is operated is obtained.

Further, instead of the specific key pairs as described above, for all key groups on the keyboard module 100 or a pair of two different keys stroked successively with partial key groups as a target, the average value of the differences of the change amounts may be obtained. For example, in a case where keys are successively operated in an order of "A"→"B"→"C", an average value of the difference between the change amount detected when the key of "A" is operated and the change amount detected when the key of "B" is operated and the difference between the change amount detected when the key of "B" is operated and the change amount detected when the key of "C" is operated is obtained.

Figure 13:
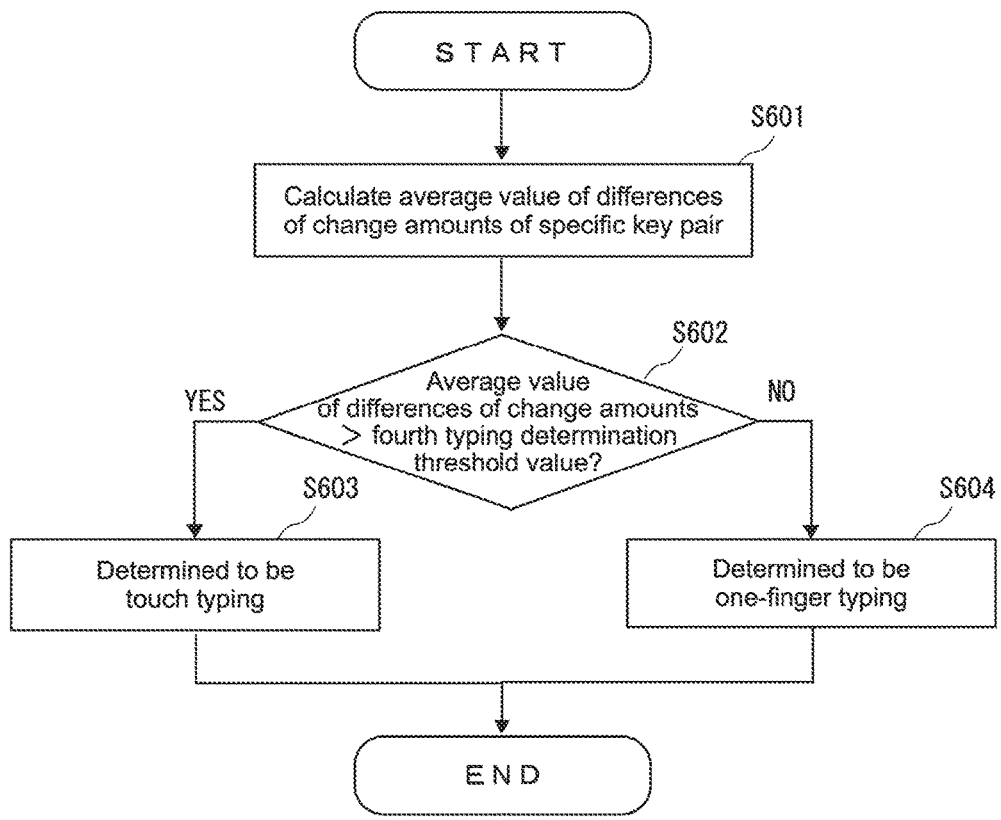
FIG. 13 A flowchart showing a typing method determination process based on an average value of differences of the change amounts.

FIG. 13 is a flowchart showing a typing method determination process based on the average value of the differences of the change amounts which is detected for a specific key pair.

Immediately after the input apparatus 1 is booted, the control circuit 340 of the controller 300 calculates the average value of the differences of the change amounts for one or more specific key pairs on the keyboard module 100 (Step S601).

It should be noted that in a case where the difference of the change amounts of the specific key pairs as described above, two keys that constitute the key pair may not have to be stroked successively.

The control circuit 340 determines a magnitude relationship between the calculated average value of the differences of the change amounts and a fourth typing determination threshold value (Step S602). The fourth typing determination threshold value is a threshold value predetermined to determine whether the typing method is the touch typing or the one-finger typing with the average value of the differences of the change amounts as an indicator.

In the case where the calculated average value of the differences of the change amounts is more than the fourth typing determination threshold value (YES in Step S602), the control circuit 340 determines that the typing method is the touch typing (Step S603). Further, in a case where the calculated average value of the differences of the change amounts is equal to or less than the fourth typing determination threshold value (NO in Step S602), the control circuit 340 determines that the typing method is the one-finger typing (Step S604).

The determination of the typing method using the average value of the differences of the change amounts as the indicator described above is performed until a predetermined number of shift amounts after the input apparatus 1 is booted. Instead, the determination of the typing method may be performed repeatedly each time the predetermined number of shift amounts are obtained during the operation of the input apparatus 1.

(Contact to Palm Rest in Front of Keyboard)

Figure 17:
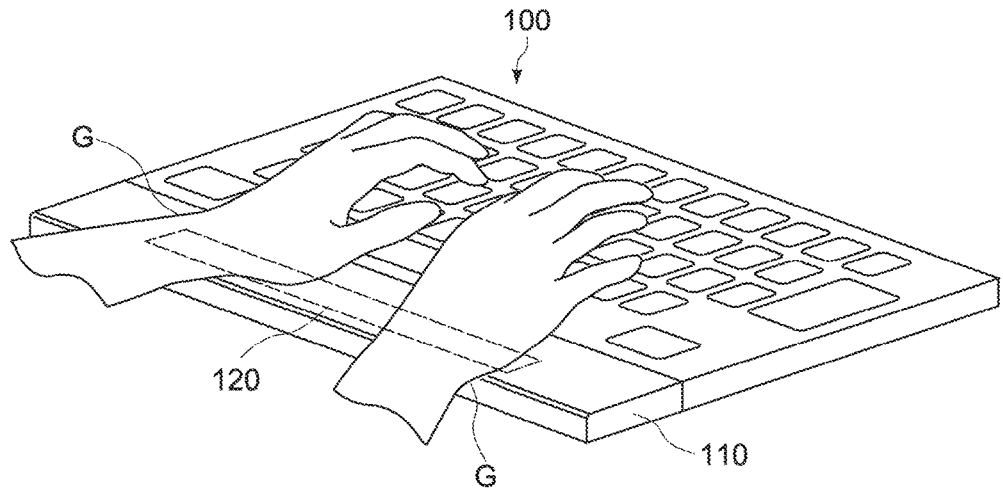
FIG. 17 A perspective view showing a positional relationship between wrists of a user at a time of touch typing and a palm rest in front of the keyboard module.

As shown in FIG. 17, generally, the touch typing is performed in a state where wrists G of both arms of the user are supported by a palm rest 110 in front of the keyboard module 100. In view of this, whether the user touches the palm rest 110 in front of 100 or not can be used as an indicator for determining the typing method.

Examples of a method of detecting whether the user touches the palm rest 110 or not include a method of disposing a sensor device (not shown) capable of detecting a pressure in an area 120 in the palm rest 110 with which the wrists G of both arms of the user is in contact, such as a capacitive sensor and a resistive touch sensor.

Figure 18:
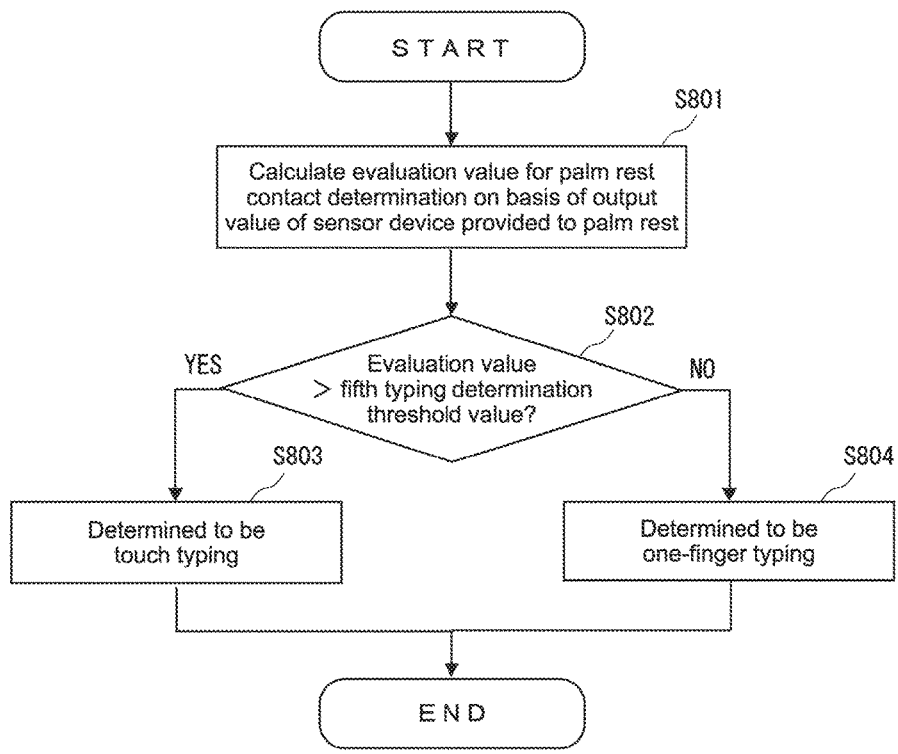
FIG. 18 A flowchart showing a typing method determination process with whether a user touches the palm rest in front of the keyboard or not as an indicator.

FIG. 18 is a flowchart showing a typing method determination process based on a detection result of whether the user touches the palm rest in front of the keyboard or not.

For a certain period immediately after the input apparatus 1 is booted, the control circuit 340 of the controller 300 obtains an output value of the sensor device provided on the area 120 in the palm rest 110 of the keyboard module 100, and calculates one of a maximum value and an average value within the certain period as an evaluation value for determining whether the palm rest is touched (Step S801).

The control circuit 340 determines a magnitude relationship between the calculated evaluation value for determining whether the palm rest is touched and a fifth typing determination threshold value (Step S802). The fifth typing determination threshold value is a threshold value predetermined to determine whether the typing method is the touch typing or the one-finger typing as the evaluation value for typing determination as the indicator.

In the case where the calculated evaluation value for determining whether the palm rest is touched is more than the fifth typing determination threshold value (YES in Step S802), the control circuit 340 determines that the typing method is the touch typing (Step S803). Further, in a case where the calculated evaluation value for determining whether the palm rest is touched is equal to or less than the fifth typing determination threshold value (NO in Step S802), the control circuit 340 determines that the typing method is the one-finger typing (Step S804).

The typing method determination using whether the user touches the palm rest in front of the keyboard or not as the indicator as described above may be continuously or periodically repeatedly performed during the operation of the input apparatus 1.

(Overall Typing Method Determination Based on Plurality of Indicators)

The typing method determination processes that uses five kinds of indicators respectively are described above. Overall evaluation may be performed for typing method determination results based on the respective five kinds of indicators, thereby generating a final determination result. Alternatively, overall evaluation may be performed for typing method determination results based on two or more kinds of indicators out of the five kinds of indicators, thereby generating a final determination result.

Examples of a method of performing overall typing method determination include the followings.

1. A point with respect to the typing method determination result based on each of the indicators, a total value of points with respect to a touch typing method determination result and a total value of points with respect to a none-finger typing method determination result are compared, and a result that shows a higher value is determined to be a final result.

2. As a result of typing method determinations based on an odd number of kinds of indicators, a typing method determination result based on a larger number of indicators is determined to be the final result.

3. The determination result based on each indicator is not set as the kinds (two kinds) of the typing method, but an absolute evaluation value is given to a calculation value for each indicator. The absolute evaluation value is given within a predetermined numerical range of "0" to "99", for example. Here, for example, "0" is a maximum value that indicates a probability of the none-finger typing, "99" means a maximum value that indicates a probability of the touch typing. "49" means that the probability of the none-finger typing and the probability of the touch typing are equivalent. For each indicator, an absolute evaluation value is mapped with respect to values from a minimum value to a maximum value that can be taken as effective calculation values. The control circuit 340 obtains absolute evaluation values for the plurality of indicators, respectively, compares the totals of the absolute evaluation values of the touch typing and the none-finger typing, and sets a higher one as a final determination result.

(Another Example of Adjustment of Keying Determination Threshold Value)

In the adjustment of the keying determination threshold value described above, only between the first keying determination threshold value appropriate to the touch typing and the second keying determination threshold value appropriate to the one-finger typing, the keying determination threshold value is switched. The adjustment is not limited to this, and the keying determination threshold value may be adjusted with higher resolutions of three stages or more. In this case, the control circuit 340 determines an optimal keying determination threshold value without determining the typing method from the value obtained with respect to the respective indicators described above.

(Gain Adjustment of Amplification Current)

As a method for adjusting the sensitivity with respect to the keying operation, a method of adjusting a gain of the amplification circuit, instead of the adjustment of the keying determination threshold value or in combination with the adjustment of the keying determination threshold value.

Figure 14:
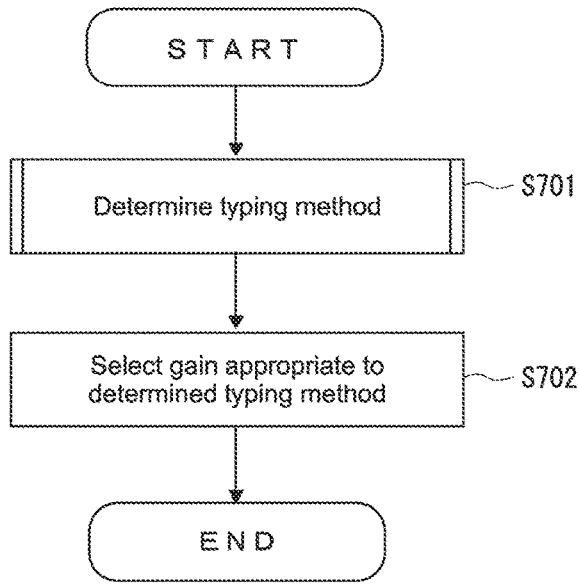
FIG. 14 A flowchart showing a gain adjustment process of an amplification circuit.

FIG. 14 is a flowchart showing a gain adjustment process of the amplification circuit.

The control circuit 340 of the controller 300 determines the typing method of the user immediately after the input apparatus 1 is booted, for example (Step S701). For the typing method determination, the method described above can be used.

In the input apparatus 1 according to this embodiment, at least a first gain appropriate to the touch typing and a second gain appropriate to the one-finger typing are stored in advance in the memory of the control circuit 340. A magnitude relationship between the first gain and the second gain is the first gain>the second gain. The control circuit 340 selects a gain appropriate to the determined typing method from the first gain and the second gain (Step S702). The selected gain is effective until the operation of the input apparatus 1 is terminated, for example. Alternatively, during the operation of the input apparatus 1, the determination of the typing method of the user and the selection of the gain may be repeatedly performed with a predetermined period.

Figure 16:
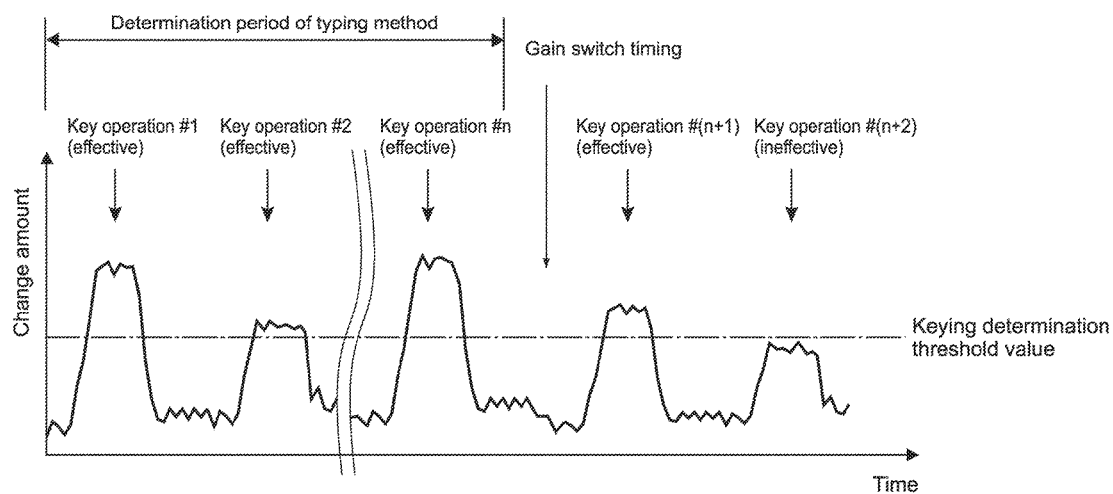
FIG. 16 A graph showing an example of a gain adjustment process.

FIG. 16 is a graph showing an example of the gain adjustment process at a time of the one-finger typing.

In this example, as the gain, the first gain appropriate to the touch typing is set initially.

In this example, an assumption is made that during the typing method determination period, the typing method is determined to be the one-finger typing. In this case, the control circuit 340 switches the gain of the amplification circuit from the first gain appropriate to the touch typing to the second gain appropriate to the one-finger typing. The second gain is lower than the first gain, so the change amount value is lowered at a uniform rate. Out of the keys stroked with one finger by the user till that time, only a keying operation performed strongly reliably by the user is determined to be an effective keying operation, and a key input is received. For example, in FIG. 16, the change amount generated in the keying operation #(n+1) is higher than a predetermined keying determination threshold value, so the keying operation #(n+1) is determined to be an effective keying operation. Further, the change amount generated in the keying operation #(n+2) is lower than the predetermined keying determination threshold value, so the keying operation #(n+2) is determined to be an ineffective keying operation.

It should be noted that in a case where the gain is adjusted in accordance with the typing method determination result as described above, the keying determination threshold value may be fixed, and the keying determination threshold value may also be changed.

As described above, in this embodiment, it is possible to automatically set the sensitivity with respect to the keying operation appropriate to each of the typing methods of the touch typing and the one-finger typing. As a result, it is possible to achieve the input apparatus 1 with good operability for each of a user who performs the touch typing and a user who performs the one-finger typing.

Modified Example 1

In the above, description is given on the method of adjusting the intensity of the response information from the keying response device 200 and the sensitivity with respect to the keying operation on a basis of the change amount from the initial value of the capacitance, as the change information relating to the capacitance of the capacitive element C. The change amount is not used as the indicator, but as shown in FIG. 7, on a basis of a maximum value of a change speed ($\Delta C/\Delta t$) of rising of the change amount (change information relating to the capacitance of the capacitive element C), the intensity of the response information from the keying response device 200 and the sensitivity with respect to the keying operation may be adjusted.

In the above embodiment, as the sensor device that detects the pressure applied to the key area by the user, the capacitive sensor or the resistive touch sensor is used to detect the keying operation. However, in a case where a pressure sensor that directly detects an operation pressure for each key is used to detect the keying operation, the present technology can also be applied.

It should be noted that the present technology can take the following configurations.

(1) An input apparatus, including:

a keyboard module having a plurality of key areas, and having a plurality of sensor devices capable of detecting a pressure of a keying operation for each of the key areas; and a control circuit that adjusts a parameter of a processing relating to the keying operation of the keyboard module on a basis of information relating to a pressure detected by the sensor device for each of the key areas.

(2) The input apparatus according to (1), further including:

a keying response device capable of giving a response of a sense of operation with respect to the keying operation for each of the key areas for the keyboard module as response information to a user, in which the control circuit is configured to adjust an intensity of the response information of the keying response device as the parameter on a basis of information relating to the pressure.

(3) The input apparatus according to (1), in which the control circuit is configured to adjust a sensitivity with respect to the keying operation for each of the key areas as the parameter on a basis of information relating to the detected pressure.

(4) The input apparatus according to (1), in which
the control circuit is configured to perform a determination among a plurality of typing methods including at least touch typing and one-finger typing, and on a basis of a result of the determination, adjust a sensitivity with respect to the keying operation as the parameter.

(5) The input apparatus according to (4), in which
the control circuit is configured to determine the typing method on a basis of information relating to the pressure with respect to the keying operation for one or more specific key areas corresponding to a home position immediately after booting.

(6) The input apparatus according to (4), in which
the control circuit is configured to determine the typing method on a basis of a typing speed.

(7) The input apparatus according to (4), in which
the control circuit is configured to determine the typing method on a basis of an average value of pieces of information relating to the pressure.

(8) The input apparatus according to (4), in which
the control circuit is configured to determine the typing method on a basis of a difference between two pieces of information relating to the pressure respectively detected with respect to the keying operations for two key areas.

(9) The input apparatus according to (8), in which
the two key areas are two key areas determined as a pair on the keyboard module in advance.

(10) The input apparatus according to (8), in which
the two key areas are two key areas stroked successively on the keyboard module.

(11) The input apparatus according to any one of (1) to (10), in which
the sensor device is a mutual capacitance type capacitive sensor that detects the pressure of the keying operation for each of the key areas as a change in capacitance.

(12) The input apparatus according to any one of (1) to (10), in which
the sensor device is a resistive touch sensor that detects the pressure of the keying operation for each of the key areas as a change in resistance value.

REFERENCE SIGNS LIST 1 input apparatus
10 operation member
10a key area
11 base material
12 conductive layer
20 electrode substrate
21 first wiring substrate
22 second wiring substrate
30 support body
100 keyboard module
200 keying response device
211 drive electrode
221 detection electrode
300 controller
310 drive circuit
320 switch circuit
330 detection signal processing circuit
340 control circuit

The invention claimed is:
1. An input apparatus, comprising:
a keyboard module that comprises a plurality of key areas and a plurality of sensor devices,
wherein each sensor device of the plurality of sensor devices is configured to detect a pressure of a keying operation for a corresponding key area of the plurality of key areas;
an amplification circuit configured to amplify a signal corresponding to the detected pressure; and
a control circuit configured to:
determine a typing method is one of a touch typing method or a one-finger typing method among a plurality of typing methods, based on the detected pressure of the keying operation; and
adjust a gain of the amplification circuit based on a result of the determination of the typing method.

2. The input apparatus according to claim 1, further comprising
a keying response device configured to generate, response information, based on the keying operation for each of the plurality of key areas,
wherein the control circuit is further configured to adjust, an intensity of the response information of the keying response device, based on the detected pressure.

3. The input apparatus according to claim 1, wherein
the control circuit is further configured to determine the typing method after a booting operation,
the typing method is determined, based on the detected pressure of the keying operation, for at least one key area of the plurality of key areas, and
the at least one key area corresponds to a home position.

4. The input apparatus according to claim 1, wherein the control circuit is further configured to determine the typing method based on a typing speed.

5. The input apparatus according to claim 1, wherein the control circuit is further configured to determine the typing method based on an average value of a plurality of pieces of information associated with the detected pressure.

6. The input apparatus according to claim 1, wherein
the control circuit is further configured to determine the typing method based on a difference between first information and second information,
the first information is associated with the detected pressure of the keying operation on a first key area of the plurality of key areas, and
the second information is associated with the detected pressure of the keying operation on a second key area of the plurality of key areas.

7. The input apparatus according to claim 6, wherein the first key area and the second key area are determined as a pair on the keyboard module in advance.

8. The input apparatus according to claim 6, wherein the first key area and the second key area are stroked successively on the keyboard module.

9. The input apparatus according to claim 1, wherein each of the plurality of sensor devices is a mutual capacitance type capacitive sensor configured to detect the pressure, of the keying operation for the corresponding key area of the plurality of key areas, as a change in capacitance.

10. The input apparatus according to claim 1, wherein each of the plurality of sensor devices is a resistive touch sensor configured to detect the pressure, of the keying operation for the corresponding key area of the plurality of key areas, as a change in resistance value.

11. An input apparatus, comprising:
a keyboard module that includes a plurality of key areas and a plurality of sensor devices, wherein each sensor device of the plurality of sensor devices is configured to detect a pressure of a keying operation for a corresponding key area of the plurality of key areas; and a control circuit configured to:
  adjust a parameter of a process, related to the keying operation of the keyboard module, based on information related to the detected pressure of the keying operation;
  determine a typing method is at least one of a touch typing method or a one-finger typing method among a plurality of typing methods, based on the information related to the detected pressure; and
  adjust a sensitivity, with respect to the keying operation as the parameter, based on a result of the determination of the typing method.

12. An input apparatus, comprising:
a keyboard module that includes a plurality of key areas and a plurality of sensor devices, wherein each sensor device of the plurality of sensor devices is configured to detect a pressure of a keying operation for a corresponding key area of the plurality of key areas; and
a control circuit configured to:
  determine a typing method is one of a touch typing method or a one-finger typing method among a plurality of typing methods, based on the detected pressure of the keying operation; and
  adjust a sensitivity with respect to the keying operation based on a result of the determination of the typing method.

* * * * *